United States Patent [19]

Dudley

[11] 3,882,997
[45] May 13, 1975

[54] COMBINATION HARPOON-TYPE CONVEYOR AND COOLANT LIQUID TROUGH

[75] Inventor: Russell D. Dudley, Kalamazoo, Mich.

[73] Assignee: Prab Conveyors, Inc., Kalamazoo, Mich.

[22] Filed: May 29, 1973

[21] Appl. No.: 364,735

Related U.S. Application Data

[63] Continuation-in-part of Ser. No. 274,437, July 24, 1972, abandoned.

[52] U.S. Cl. ............................... 198/224; 198/225
[51] Int. Cl. ............................................. B65g 25/08
[58] Field of Search .......... 198/221, 224, 225, 174, 198/204; 209/462; 29/DIG. 76, DIG. 87; 134/49, 165; 62/374, 375

[56] References Cited
UNITED STATES PATENTS

| | | | |
|---|---|---|---|
| 2,336,698 | 12/1943 | Morrill | 198/196 |
| 2,635,735 | 4/1953 | Smith | 198/204 |
| 2,785,792 | 3/1957 | Cordis | 198/224 |
| 3,164,967 | 1/1965 | Marshall | 62/375 |
| 3,175,677 | 3/1965 | Peras | 198/224 |
| 3,542,187 | 11/1970 | Assauer | 198/225 |
| 3,659,702 | 5/1972 | Assauer | 198/221 |

Primary Examiner—Evon C. Blunk
Assistant Examiner—Richard K. Thomson
Attorney, Agent, or Firm—Gordon W. Hueschen

[57] ABSTRACT

Combination harpoon-type conveyor and coolant liquid trough comprises a conveyor trough means having a pair of upstanding side walls and a bottom, reciprocating conveyor means in said trough means and adapted for reciprocating movement therein, and a partition member provided in the trough means alongside at least one of the upstanding side walls, spaced from the side wall and the trough bottom, and extending longitudinally along the side wall. In a preferred embodiment, an elongated guide member extends longitudinally in the trough means and is attached to the bottom thereof, and reciprocating conveying means bearing a plurality of spaced drive members is mounted on said guide member.

6 Claims, 2 Drawing Figures

COMBINATION HARPOON-TYPE CONVEYOR AND COOLANT LIQUID TROUGH

This application is a continuation-in-part of U.S. application Ser. No. 274,437, filed July 24, 1972, now abandoned.

BACKGROUND OF THE INVENTION

This invention relates to conveyors. More particularly, this invention relates to the so-called harpoon-type conveyors.

A harpoon-type conveyor generally comprises one or more spaced, reciprocating drive members which usually comprise pairs of pushing blades normally arranged in a V-shaped or similar configuration and attached to a conveyor rod or chain, which may be and preferably are mounted on a suitable guide member situated in a conveyor trough and which are in any event located in said trough and adapted for reciprocating movement within the trough. The exact method or means of locating the reciprocating conveyor means within the trough means may be widely varied, and elongated guide members in the trough bottom, although frequently employed in various shapes and forms, are not essential since the conveyor itself may engage the trough bottom directly or through interposition of a wear block or plate located on the trough bottom, and necessary or desired guidance may if desired be provided the conveyor by means of smaller guide members or wear plates or the configuration of the trough bottom itself, as by providing the trough bottom with a slight "V" configuration and providing a matching V in the bottom of the conveyor itself, all as is well known. The conveyor rod or chain bearing the drive members is sometimes also referred to as the harpoon. Typical such conveyors are illustrated in U.S. Pat. Nos. 3,112,025; 3,175,677; 3,158,257; 3,659,702, and German Pat. No. 1,139,068 of Bachmann dated October, 1962.

Conveyors of this general type are particularly well suited for transporting of metal or plastic chips generally produced during manufacturing processes with machine tools such as lathes, milling machines, drills, gear hobbers, boring mills, and the like. Also, inasmuch as in most instances during the aforementioned machining operations coolant liquids are used, the trough-shaped housing of the harpoon conveyor is frequently utilized as a transport conduit for the spent coolant liquids. However, when a relatively large bundle of chips is conveyed or when the overall chip load on the conveyor is relatively heavy, the flow of coolant liquids in the trough is materially impeded and sometimes even blocked. As a result, coolant liquid overflows the trough and is lost. Furthermore, such incidents cause plant housekeeping problems and are generally undesirable.

It is an object of the present invention to obviate the aforementioned shortcomings in a harpoon-type conveyor. Still other objects of this invention will present themselves to the skilled artisan upon reference to the ensuing specification, the drawing, and the claims.

SUMMARY OF THE INVENTION

The present invention contemplates a combination harpoon-type conveyor and coolant liquid trough comprising a conveyor trough means having a pair of upstanding side walls and a bottom and a partition member mounted in said trough means alongside at least one, and preferably both, of said upstanding side walls. The partition member is spaced from the side wall and from the trough bottom, and extends longitudinally along the side wall for at least a portion thereof. A reciprocating conveyor means is located in said trough means and adapted for reciprocating movement within the trough. In a preferred embodiment, an elongated guide member extends longitudinally in the trough means and is fixedly secured to the bottom thereof, and a plurality of spaced drive members are attached to a reciprocating conveying means which, in turn, is mounted on the guide member.

DESCRIPTION OF THE PREFERRED EMBODIMENTS

Figure 1:
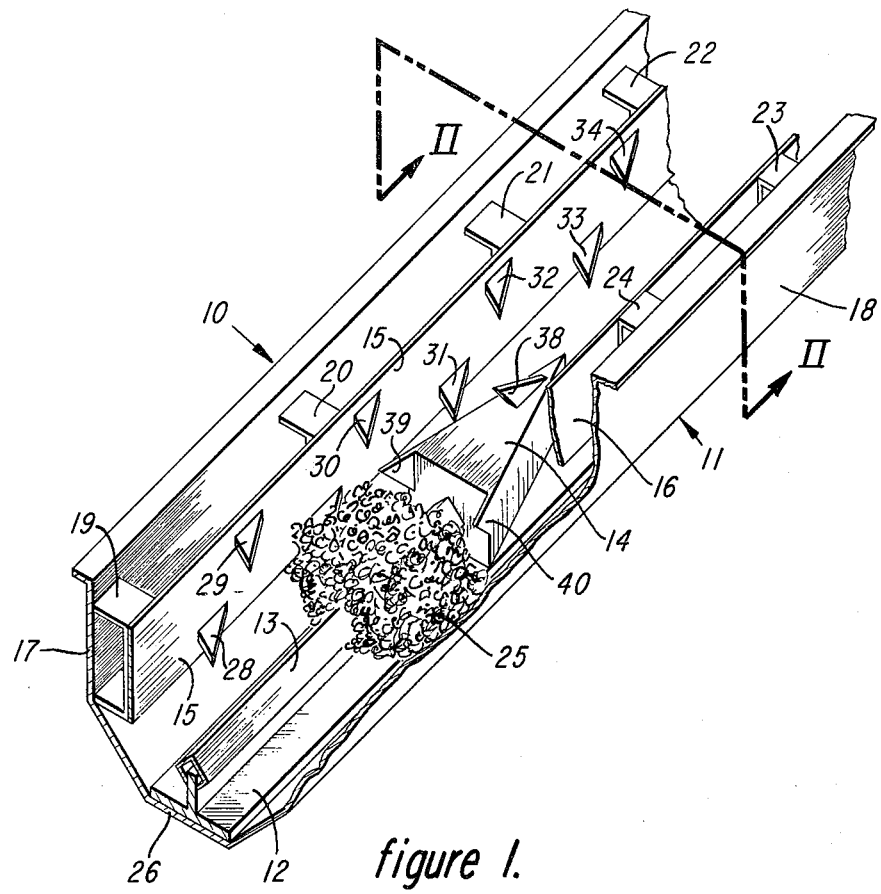
FIG. 1 is a fragmentary perspective view of a harpoon-type conveyor embodying the present invention, partially broken away to show interior detail.
Figure 2:
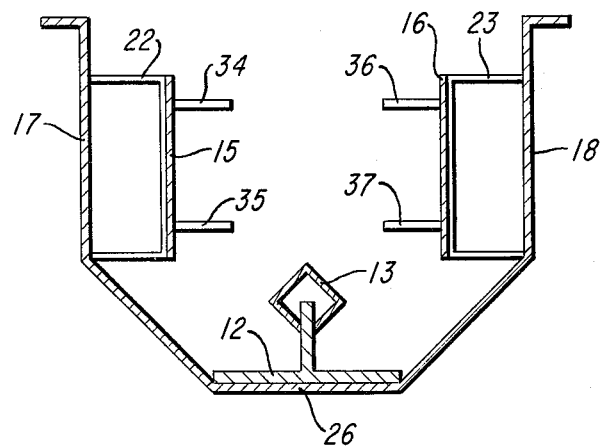
FIG. 2 is a sectional elevation taken along line II — II in FIG. 1 and showing the transverse cross-section of the conveyor.

Referring to FIGS. 1 and 2, harpoon conveyor 10 comprises a conveyor trough 11 to the bottom of which is fixedly secured elongated guide member 12, conveyor rod 13 slidably mounted on guide member 12 and adapted for back and forth motion along guide member 12, and a plurality of spaced, reciprocating drive members such as drive member 14 attached to conveyor rod 13. Metal strips 15 and 16 are mounted in trough 11 on the respective side wall upper portions 17 and 18 thereof by means of suitable brackets 19, 20, 21, 22, 23 and 24, and serve as partition members within trough 11 providing unobstructed flow passageways for coolant liquid regardless of the size or density of chip load 25 present at any given time in trough 11. Metal strips 15 and 16 can extend along the respective side walls of trough 11 for substantially the entire length thereof or for at least a portion of the side walls, as desired. Usually metal strips 15 and 16 are deployed in trough 11 from the point of input of the wet chips to the point of chip discharge or removal from trough 11.

Preferably metal strips 15 and 16 are substantially parallel to the respective upper portions 17 and 18 of the trough side walls and are spaced therefrom and also spaced from trough bottom 26. In this manner coolant liquid can flow readily along the bottom portion of trough 11, yet when the flow is impeded or if a damming condition occurs at any time in trough 11, the aforementioned unobstructed flow passageways provide the principal conduit for the coolant liquid. Substantially horizontal stationary barbs 28, 29, 30, 31, 32, 33, 34 and 35 are provided on the surface of strip 15 facing the central portion of trough 11. Strip 16 can be similarly equipped as illustrated by barbs 36 and 37 shown in FIG. 2. Such barbs assist in the transporting of a chip bundle along trough 11 because the barbs permit the chip bundle to slide by while moving in the forward direction during the forward stroke of conveyor rod 13 which carries a plurality of spaced drive members such as member 14. At the same time the barbs prevent a retrograde motion by the chip bundle during the return stroke. Substantially vertical barbs such as barb 38 can be provided on drive member 14 to further assist the forward movement of a chip bundle.

Metal strips 15 and 16 illustrate a preferred type of partition member; however, a series of longitudinal strips spaced relative to each other can be utilized in lieu of a single wide strip. In addition, each partition member can comprise a longitudinally-extending series of plate members individually mounted on upper portions 17 and 18, spaced therefrom, but at an acute angle of about 5° to about 15° relative thereto, so that the series of plate edges coming into contact with a chip bundle present in the trough assume a ratchet-like configuration which serves substantially the same purpose as the aforementioned substantially horizontal barbs.

Similarly, while FIG. 1 illustrates a preferred type of harpoon comprising rigid reciprocating conveyor rod 13 with drive members such as member 14 mounted thereon and having pushing blades 39 and 40 arranged in a V-shaped configuration, other harpoon designs can be utilized as well. For example, the chip conveying means can be a rigid round tube mounted on a cylindrical portion of a guide rail as shown in U.S. Pat. No. 3,659,702, or a plurality of tubular sections each carrying a drive member and hingedly interconnected as shown in U.S. Pat. No. 3,158,257. Also, the harpoon may comprise a chain provided with appropriate drive members as shown in U.S. Pat. Nos. 3,112,025 and 3,175,677. In addition, as previously stated, the elongated guide member at the trough bottom can be eliminated entirely and replaced by a series of smaller guide members or wear plates and/or the conveyor blades may rest partially or completely on the trough bottom, directly or through a wear plate, and further guidance may if desired be given to the conveyor by providing the conveyor blade bottom or bottom edge and the trough bottom and matching V or other matching configuration, all as is already known in the art.

The foregoing discussion and the drawing are intended as illustrative but are not to be construed as limiting. Still other variations and rearrangements of parts within the spirit and scope of the present invention will readily become apparent to one skilled in the art.

I claim:

1. Combination harpoon-type conveyor and coolant liquid trough which comprises
    a conveyor trough means having a pair of upstanding side walls and a bottom;
    a reciprocating conveying means in said trough means and adapted for reciprocating movement therein; and
    a partition member mounted in said trough means alongside at least one of said upstanding side walls, spaced inwardly from said side wall and above said bottom, and extending longitudinally along said side wall for at least a portion thereof, the space intermediate said side wall and said partition member being in communication with the space in said trough along substantially the entire length of said partition member providing unobstructed flow passageways for liquid.

2. The conveyor and coolant liquid trough combination in accordance with claim 1 wherein a partition member is mounted in said trough means alongside each of said upstanding side walls.

3. The conveyor and coolant liquid trough combination in accordance with claim 1 wherein the partition member is a continuous strip substantially parallel to the upper portion of the adjacent side wall and wherein a plurality of substantially horizontal barbs is mounted on the strip surfaces facing the central portion of the trough means.

4. Combination harpoon-type conveyor and coolant liquid trough which comprises
    a conveyor trough means having a pair of upstanding side walls and a bottom;
    an elongated guide member extending longitudinally in said trough means and fixedly secured to the bottom thereof;
    a reciprocating conveying means bearing a plurality of spaced drive members mounted on said guide member; and
    a partition member mounted in said trough means alongside at least one of said upstanding side walls, spaced inwardly from said side wall and above said bottom, and extending longitudinally along said side wall for at least a portion thereof, the space intermediate said side wall and said partition member being in communication with the space in said trough along substantially the entire length of said partition member providing unobstructed flow passageways for liquid.

5. The conveyor and coolant liquid trough combination in accordance with claim 4 wherein a partition member is mounted in said trough means alongside each of said upstanding side walls.

6. The conveyor and coolant liquid trough combination in accordance with claim 5 wherein each partition member is a continuous strip substantially parallel to the upper portion of the adjacent side wall and wherein a plurality of substantially horizontal barbs is mounted on the strip surfaces facing the central portion of the trough means.

* * * * *